United States Patent [19]

Yamada

[11] Patent Number: 5,117,335
[45] Date of Patent: May 26, 1992

[54] HEADLIGHT FOR VEHICLE
[75] Inventor: Masaru Yamada, Shizuoka, Japan
[73] Assignee: Koito Manufacturing Co., Ltd., Tokyo, Japan
[21] Appl. No.: 625,193
[22] Filed: Dec. 10, 1990
[30] Foreign Application Priority Data Dec. 28, 1989 [JP] Japan .................. 1-338381
Dec. 28, 1989 [JP] Japan .................. 1-338382
Dec. 28, 1989 [JP] Japan .................. 1-338383

[51] Int. Cl.⁵ .............................. B60Q 1/00
[52] U.S. Cl. ..................... 362/61; 362/268; 362/331; 362/282
[58] Field of Search ........... 362/61, 80, 268, 331, 362/328, 346, 299, 455, 374, 375, 282

[56] References Cited
U.S. PATENT DOCUMENTS

| | | | |
|---|---|---|---|
| 3,456,153 | 7/1969 | Smith | 362/80 |
| 3,849,642 | 11/1974 | Puyplat | 362/268 |
| 4,520,434 | 5/1985 | Birt | 362/61 |
| 4,631,642 | 12/1986 | Brun | 362/61 |
| 4,827,388 | 5/1989 | Miyazawa | 362/282 |
| 4,849,861 | 7/1989 | Arima | 362/80 |
| 4,855,877 | 8/1989 | Otaka | 362/80 |
| 4,903,173 | 2/1990 | Mochizuki et al. | 362/282 |
| 4,949,226 | 8/1990 | Makita et al. | 362/61 |
| 5,021,930 | 6/1991 | Yamada | 362/305 |

FOREIGN PATENT DOCUMENTS

| | | |
|---|---|---|
| 0262586 | 9/1987 | European Pat. Off. . |
| 0275095 | 1/1988 | European Pat. Off. . |
| 3827137 | 2/1989 | Fed. Rep. of Germany ...... 362/282 |
| 2564845 | 5/1984 | France . |
| 2611859 | 2/1987 | France . |
| 2601111 | 1/1988 | France ........... 362/282 |
| 0218440 | 12/1983 | Japan ............... 362/61 |

Primary Examiner—Ira S. Lazarus
Assistant Examiner—D. M. Cox
Attorney, Agent, or Firm—Sughrue, Mion, Zinn, Macpeak & Seas

[57] ABSTRACT

A vehicular headlight having an inner lens and a hood, which is painted to block light, integrally made of a light-transmissible resin so that no opening is formed between the inner lens and the hood. As a result, no light can leak through such an opening, and the adjustment gap between the inner lens and reflector cannot be seen through the opening. Since the inner lens and the hood are constituted by a single component, the number of components of the headlight is reduced to decrease the number of steps of assembly thereof.

28 Claims, 9 Drawing Sheets

HEADLIGHT FOR VEHICLE

BACKGROUND OF THE INVENTION

The present invention relates generally to a vehicular headlight, and more particularly relates to the construction of an ornamental frame provided around an inner lens and which is referred to as hood.

In a conventional vehicular headlight, light emitted from the filament of a bulb (light source) is reflected by a reflector so that the light is directed out through an inner lens and an outer lens. The inner lens is disposed between the outer lens and the open side of the reflector, thereby dividing the inner space of the headlight into an outer lens side and a reflector side. An ornamental frame, referred to as hood, is provided between the inner and the outer lenses. The hood is shaped in such a manner that it appears like an extension of the front edge of the reflector. The hood functions so that the inner portion of the headlight near the inner and the outer lenses is prevented from being seen from outside the headlight, which would degrade the appearance of the headlight. The hood is provided separately from the other components of the headlight and then attached to the body of the headlight as well as the inner and the outer lenses.

In general, there are two types of vehicular lamps producing parallel light beams. One lamp type employs a parabolic reflector, and the other an elliptic reflector and a projection lens. The latter type is so-called a projection lamp. Projection lamps are advantageous in that they can be made smaller in size than the former type, as disclosed in U.S. Pats. Nos. 4,677,532, 2,338,901 and 1,581,581.

In a projection lamp, a light source is positioned substantially at the first focal point of the elliptic reflector. The light rays emitted from the light source are reflected by the elliptic reflector and focused by the projection lens. The projection lens is located substantially at the second focal point of the elliptic reflector. The light rays passed through the projection lens are gathered along an optical axis and form a required pattern of light.

Conventionally, since the projection lens is small in size, the lens is covered by an outer lens which is larger in size than the projection lens, and protected by a protector which is mounted along the circumference of the lens in order to obtain a good perspective with respect to the vehicle body when viewed from the outside.

Since the hood and inner lens of the conventional headlight mentioned above are separately provided components, an opening is usually formed between the hood and the inner lens at the time of assembly of the headlight. The reflector must be able to swing through a small angle relative to the body of the vehicle so as to adjust the angle of the direction of emission of the light from the headlight. That is, to enable the adjustment, an adjustment gap is provided between the reflector and the inner lens. If the opening is present between the hood and the inner lens, the adjustment gap can be seen through the opening, degrading the appearance of the headlight. Moreover, the opening lets light leak. Therefore, the presence of this opening produces undesirable effects.

Furthermore, since the hood is a separately provided component, the number of components of the headlight is large, as is the number of steps of assembly of the headlight. Yet further, if the space between the outer lens side and the reflector side is sealed or narrowed, the inner surface of the inner lens or outer lens may be fogged by humid air heated by the bulb. Such fogging creates a problem in that the light rays emitted by the light source are diffused in random directions, thereby causing discomforting glare or reducing the amount of output light. Moreover, since the space surrounded by the projection lens, protector and outer lens is heated by the bulb to a relatively high temperature, the protector and outer lens, which are ordinarily made from a resin, can be deformed due to the heat.

SUMMARY OF THE INVENTION

The present invention was made in order to solve the above-mentioned problems. Accordingly, it is an object of the present invention to provide a vehicular headlight in which no opening is present between the hood and inner lens so that light is prevented from leaking, the adjustment gap between the reflector and the inner lens is prevented from being seen, and the number of components of the headlight is reduced to decrease the number of steps of assembly of the headlight.

It is another object of the invention to provide a vehicular headlamp capable of preventing the inner surface of the inner lens and outer lens from being fogged.

It is still another object to provide a vehicular headlamp in which the protector and outer lens are not deformed by the heat of the bulb.

In the headlight of the invention, the light from a light source is reflected by a reflector so that the light is directed out through the inner lens and an outer lens. The hood is provided between the inner and the outer lenses and extends around the inner lens. The inner lens and the hood are integrally made of a light-transmissible resin. The hood is painted to block light.

In the headlight provided in accordance with the present invention in which the inner lens and the hood are integrally made of the light-transmissible resin and the hood is painted to block the light, the hood serves as an ornamental frame through which the light cannot be transmitted. Since the inner lens and the hood are integrally formed with each other, no opening is required between them so that the light is prevented from leaking through between those two members, the adjustment gap between the reflector and the inner lens cannot be seen from outside the headlight, and the number of components of the headlight is reduced to decrease the number of steps of assembly thereof.

DESCRIPTION OF THE PREFERRED EMBODIMENTS

Preferred embodiments of the present invention will be hereafter described in detail with reference to the attached drawings.

FIGS. 1-17 show a four-bulb combination headlight of a preferred embodiment of the invention. This headlight is attached to the body of a vehicle at the left-hand portion thereof as viewed by the driver.

Figure 6:
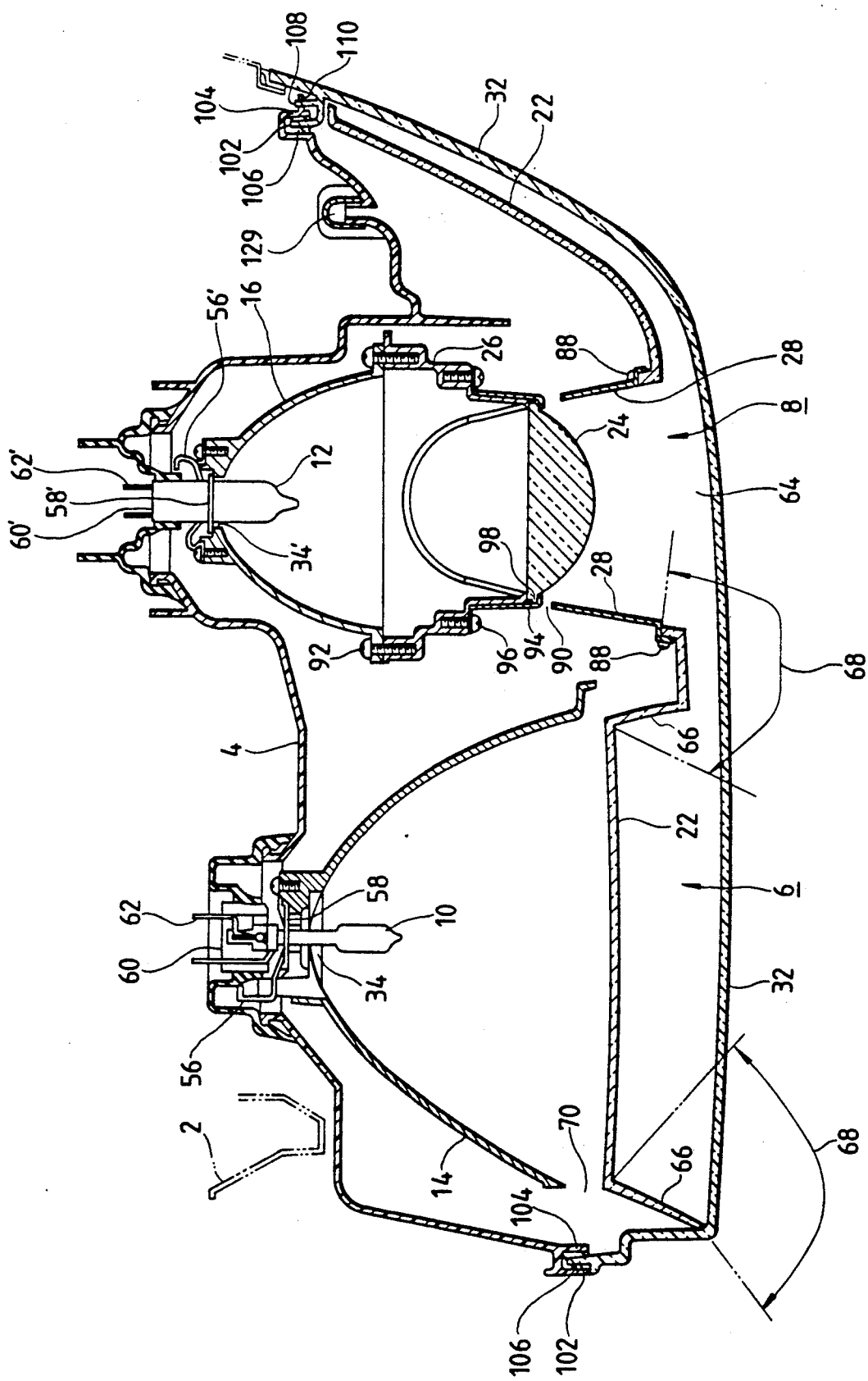
FIG. 6 is a horizontal sectional view of the headlight taken along a line A—A in FIG. 1.
Figure 13:
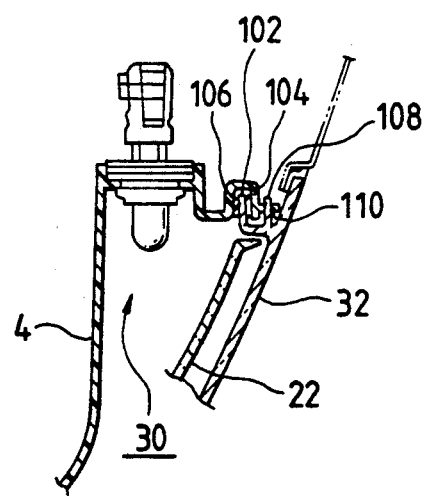
FIG. 13 is a sectional view of the headlight taken along a line R—R in FIG. 1.

As shown in FIG. 6, a high-beam lamp 6 and a low-beam lamp 8 are provided in the body of the headlight, which is attached to the body 2 of the vehicle. The lamps 6 and 8 have bulbs 10 and 12, and reflectors 14 and 16, respectively, for reflecting light emitted from the bulbs. The reflectors 14 and 16 are attached with swing angle adjustment mechanisms 18 and 20 to the headlight body 4 so that the reflectors can be swung by prescribed small angles to adjust the orientation of the optical axes thereof. The reflected light is directed out forward through an inner lens 22 or a condensing lens 24 so that the light has a prescribed distribution or range. As for the low-beam lamp 8, the portion of the light not necessary for the output light distribution pattern complying with the standards of the country where the headlight is used is blocked by a shade 17, while the remaining portion of the light is transmitted through the condensing lens 24. The lens 24 is attached with a holder 26 to the reflector 16, which is an ellipsoidal reflector. A protector 28 is provided in front of the condensing lens 24 so as to protect the portions of the headlight near the lens from the heat generated by the bulb. The protector 28 is attached to the inner lens 22. The inner lens 22 extends not only in front of the reflector 14 of the high-beam lamp 6 but also in front of a clearance lamp 30 provided at the left side of the headlight, as shown in FIGS. 6 and 13. An outer lens 32 is provided in front of the inner lens 22 and the condensing lens 24, extending continuously to the outside curved surface of the body of the vehicle so as to provide the appearance of constituting a part of the overall outside surface of the vehicle body, as dictated by design considerations.

The components of the headlight will now be described in greater detail.

Figure 8:
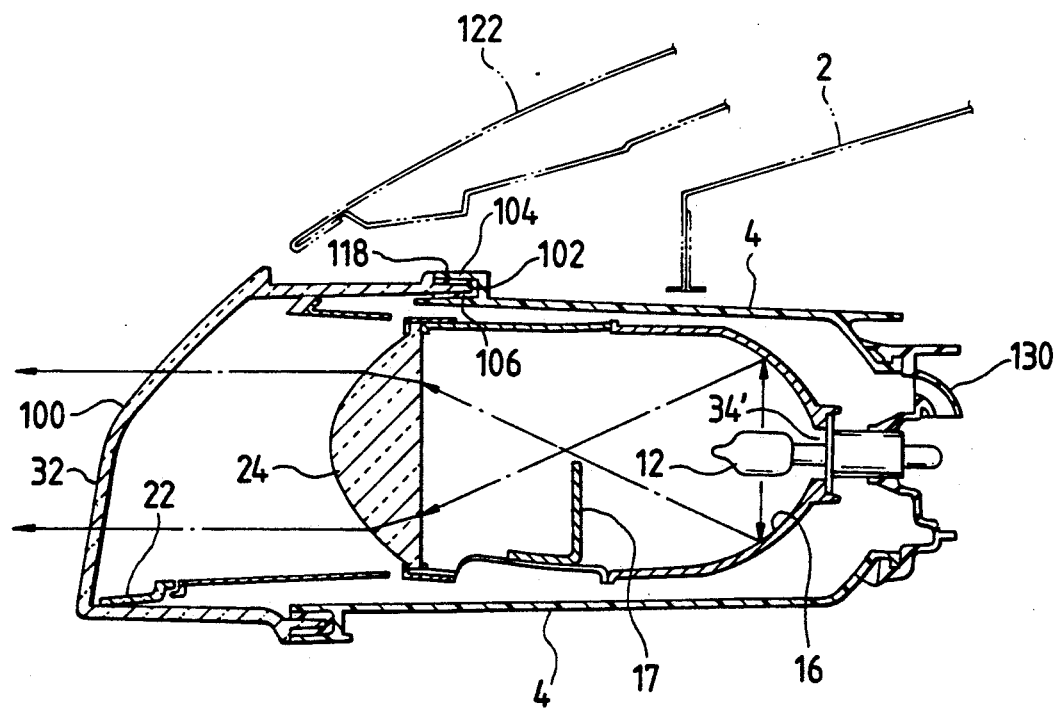
FIG. 8 is a sectional view of the headlight taken along a line B—B in FIG. 1.
Figure 11:
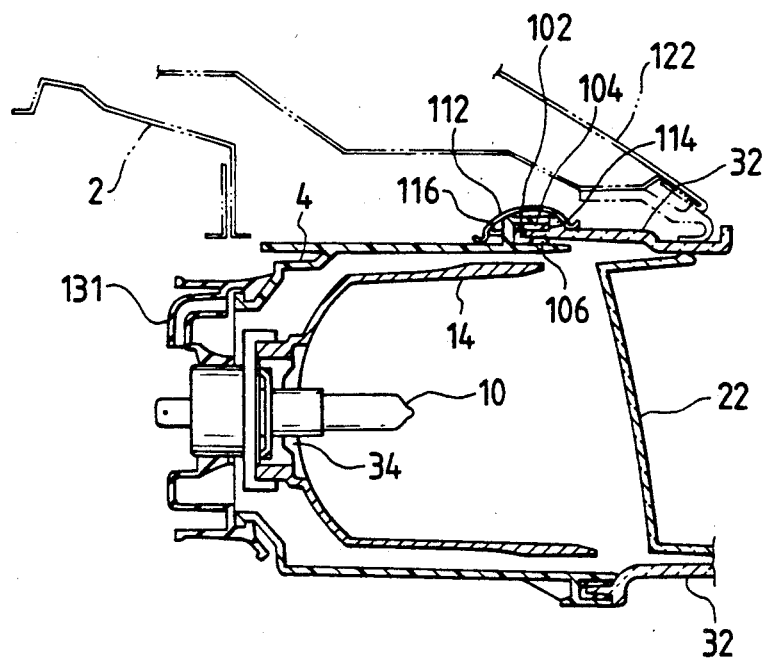
FIG. 11 is a sectional view of the headlight taken along a line E—E in FIG. 1.

The reflectors 14 and 16 are described first. The reflector 14 of the high-beam lamp 6 is a paraboloidal reflector as shown in FIG. 11. The reflector 16 of the low-beam lamp 8 is an ellipsoidal reflector as shown in FIG. 8. The central portions of the reflectors 14 and 16 have bulb insertion holes 34 and 34' in which the bulbs 10 and 12 of the lamps 6 and 8 are fitted. The shade 17 is provided in front of the reflector 16 so as to block a part of the light from the bulb 12 to effect the prescribed light distribution pattern with a cut outline.

Figure 7:
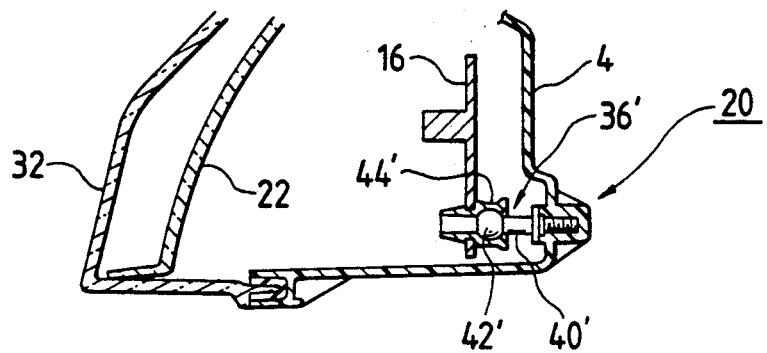
FIG. 7 is a sectional view of the headlight taken along a line D—D in FIG. 1.
Figure 12:
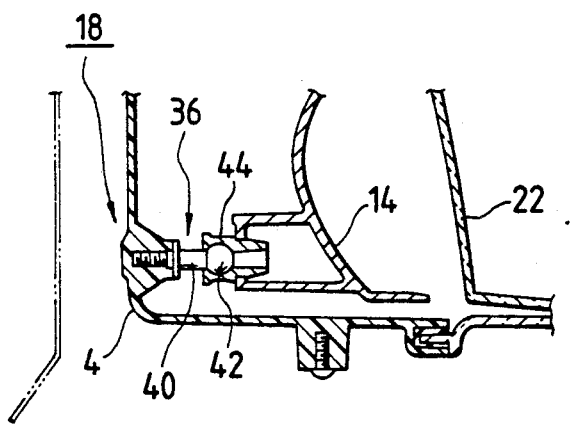
FIG. 12 is a sectional view of the headlight taken along a line F—F in FIG. 1.

The reflectors 14 and 16 are attached with the swing angle adjustment mechanisms 18 and 20 to the body 4 of the headlight. Each of the adjustment mechanisms 18 and 20 includes a fulcrum portion 36 or 36' for supporting the reflector 14 or 16 in such a manner as to make it possible to swing the reflector in all directions, and two adjusting support portions 38 or 38' for supporting the reflector. Thus, the reflector is supported at three points, as shown in FIGS. 7, 9, 10 and 12. The fulcrum portion 36 or 36' shown in FIG. 12 or 7 is formed by a ball 42 or 42' at the tip of a pivot 40 or 40' attached to the headlight body 4, and a pivot bearer 44 or 44' attached to the reflector 14 or 16 and supporting the ball. The fulcrum portions 36 and 36' serve as fulcra to change the angles of the optical axes of the reflectors 14 and 16, respectively.

Figure 9:
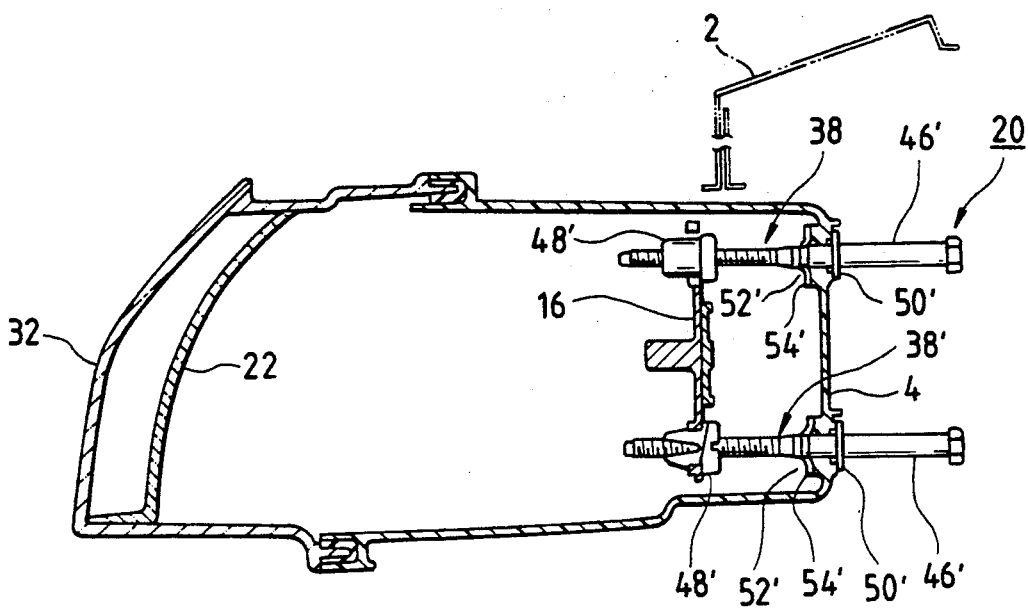
FIG. 9 is a sectional view of the headlight taken along a line C—C in FIG. 1.
Figure 10:
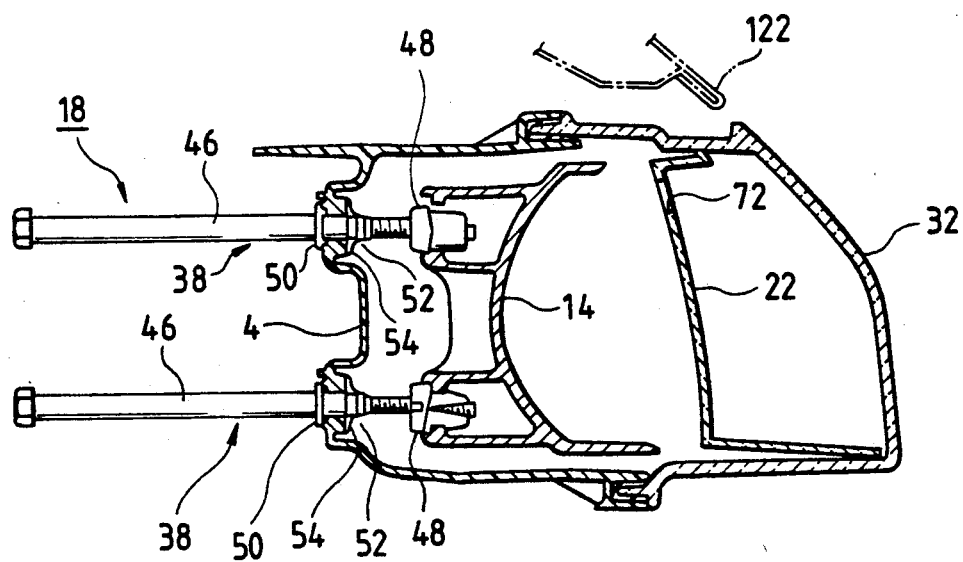
FIG. 10 is a sectional view of the headlight taken along a line G—G in FIG. 1.

The adjusting support portions 38 or 38' shown in FIG. 10 or 9 are implemented with adjusting screws 46 or 46' extending through the headlight body 4, and self-locking 48 or 48' threadedly engaged with the tip portions of the screws and secured to the reflector 14 or 16. Flanges 50 and 50' are integrally formed on the adjusting screws 46 and 46' and located in contact with the back of the headlight body 4, and fasteners 54 and 54' are press-fitted in the grooves 52 and 52' of the screws and located in contact with the inside of the headlight body, so that the headlight body is pinched between the flanges and the fasteners. As a result, the adjusting screws 46 and 46' are not moved in the axial directions thereof relative to the headlight body 4 when the screws are turned. The self-locking nuts 48 and 48' secured to the reflectors 14 and 16 can be moved in the axial directions of the nuts by the tips of the adjusting screws 46 and 46' by turning the screws. Accordingly, each of the reflectors 14 and 16 can be swung about a vertical axis by turning one of the two adjusting screws 46 or 46', and be swung about a horizontal axis in the right-to-left direction of the body of the vehicle by turning the other of the two adjusting screws. Thus, the angle of the direction of emission of light from the lamp 6 or 8 can be finely adjusted.

The lamp bulbs 10 and 12 are inserted into the bulb insertion holes 34 and 34, of the reflectors 14 and 16 from behind, as shown in FIGS. 6, 8 and 11. Setting springs 56 and 56' are provided so that the end portions of the springs whose other end portions are engaged on the reflectors 14 and 16 at the edges thereof on the bulb insertion holes 34 and 34' so as to be swingable are manually deformed by pushing. The springs 56 and 56' are engaged on the engagement portions of the reflectors at the edges thereof on the holes. As a result, the central portions of the setting springs 56 and 56' push the flanges 58 and 58' of the bulbs 10 and 12 from behind onto the reflectors 14 and 16 at the edges thereof on the bulb insertion holes 34 and 34' to fasten the bulbs to the reflectors.

The bulbs 10 and 12 have bases 60 and 60' behind the flanges 58 and 58'. Electric power is applied to terminals 62 and 62' at the bases 60 and 60' to cause the filaments of the bulbs to emit light.

The inner lens 22 is provided at the open fronts of the reflectors 14 and 16 and extends from the high-beam lamp 6 to the clearance lamp 30, as shown in FIGS. 6, 11 and 13. The inner lens 22 is made of a light-transmissible polycarbonate resin. As shown in FIG. 6, the portion of the lens 22 which corresponds to the low-beam lamp 8 has a hole 64 for fitting the protector 28. The inner lens 22 has an ornamental frame portion 66, referred to as hood, located at the high-beam lamp 6. The hood 66 is painted gray, as indicated at 68, to block a part of the light from the bulb 10 of the lamp 6.

The inner lens 22 and the hood 66 are integrally formed with each other to reduce the number of components of the headlight to decrease the number of steps of assembly thereof. Also, no opening is formed between the lens and the hood to improve the appearance of those elements as viewed from outside the headlight with respect to the case where they are separately provided. Since no opening is present between the inner lens 22 and the hood 66, an adjustment gap 70 is provided between the reflector 14 and the inner lens 22 so as to enable the adjustment of the angle of the direction of emission of light from the lamp 6. However, the gap 70 cannot be seen from outside the headlight. As a result, the headlight has a better overall appearance. Since no opening is present between the inner lens 22 and the hood 66, light does not leak through such an opening.

Figure 1:
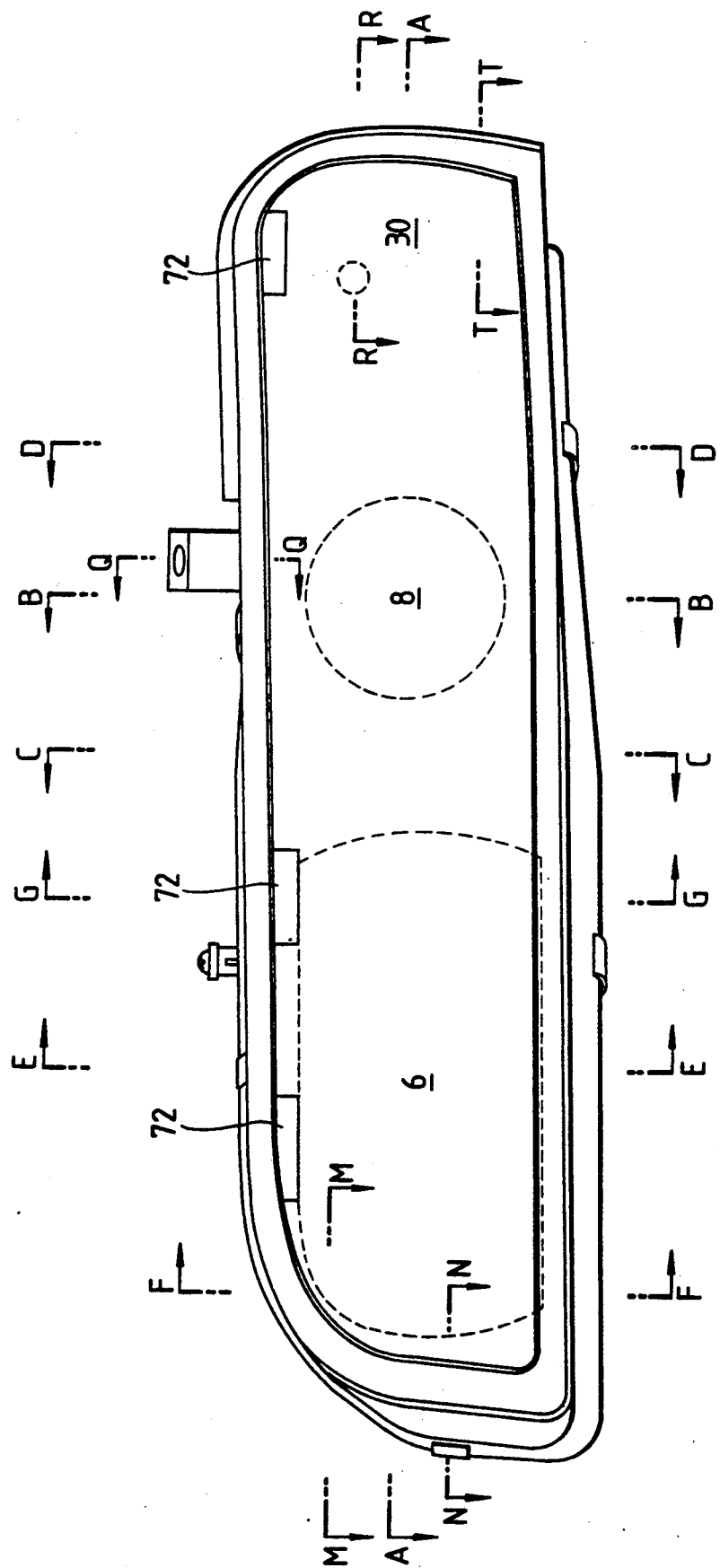
FIG. 1 is a front view of a headlight constructed according to a preferred embodiment of the present invention.
Figure 2:
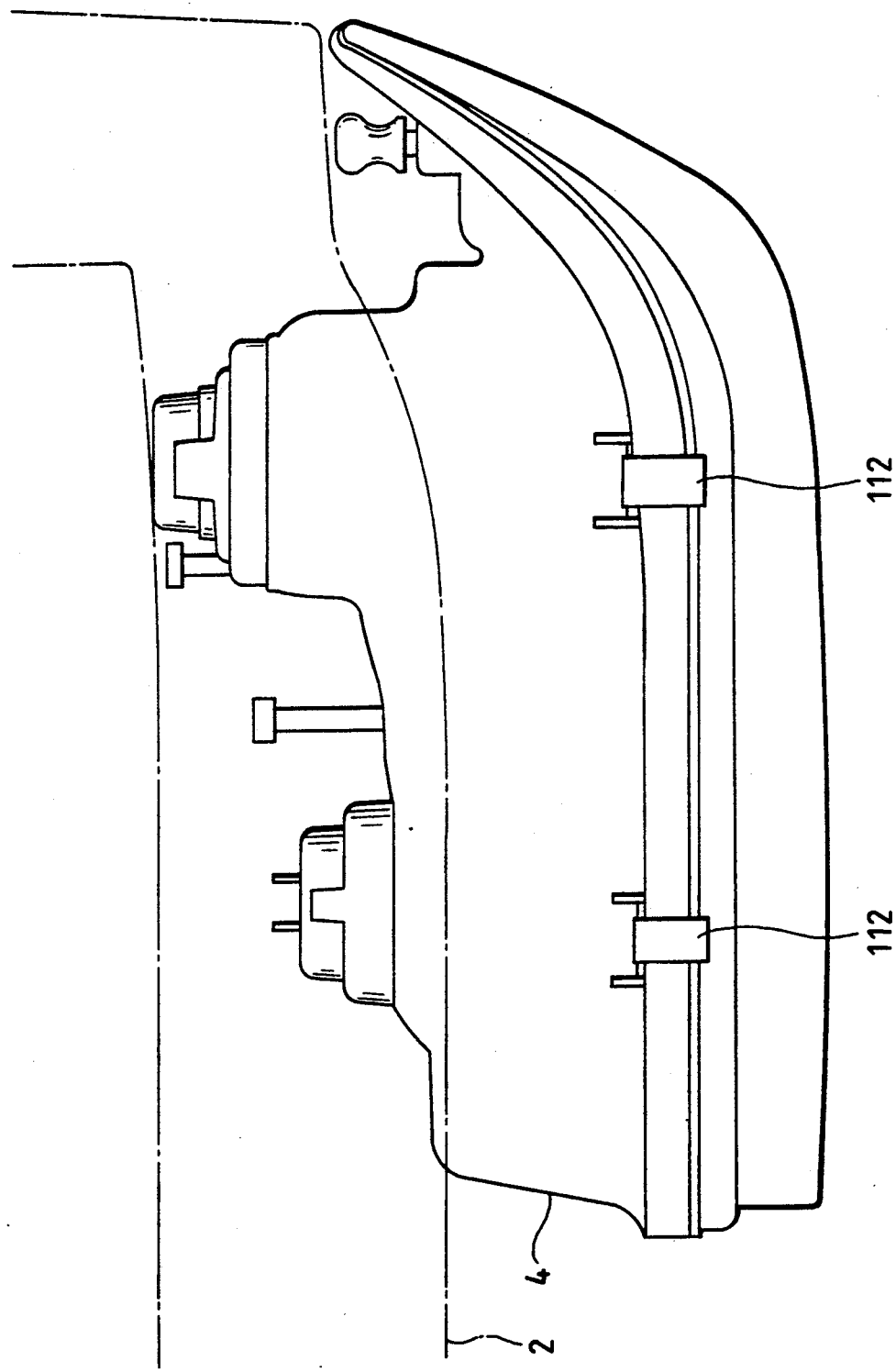
FIG. 2 is a plan view of the headlight of FIG. 1.
Figure 3:
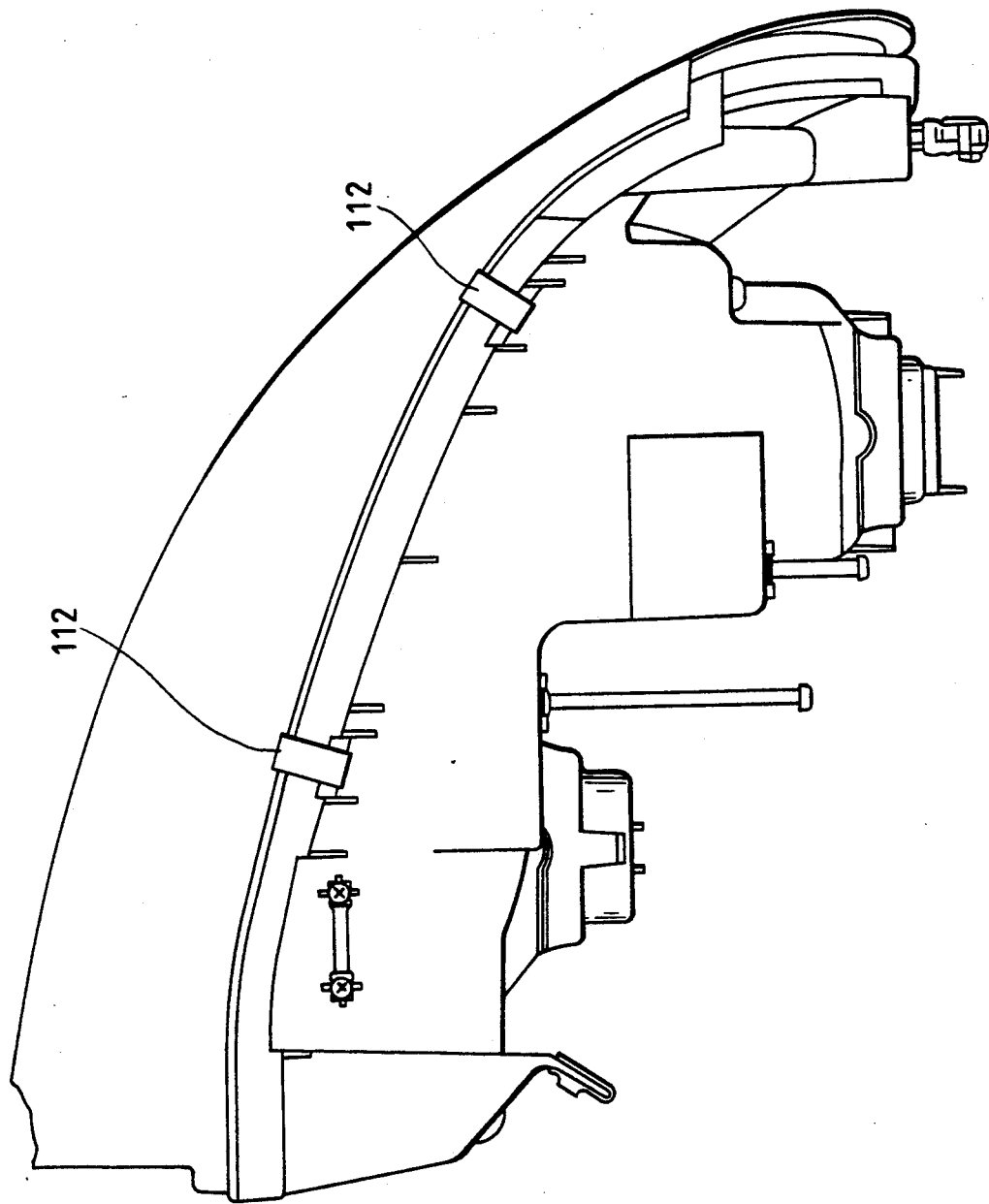
FIG. 3 is a bottom view of the headlight.

The upper portion of the inner lens 22 has air holes 72 for preventing the lens from collecting moisture, as shown in FIGS. 1 and 10. Air between the inner lens 22 and the outer lens 32 is allowed to flow into the interior of the headlight body 4 through the air holes 72 to prevent the inside surfaces of the inner and the outer lenses from collecting moisture thereon and to reduce the difference between the temperature of the inner lens and that of the surrounding ambient, thus preventing the inner lens from being thermally deformed.

Figure 14:
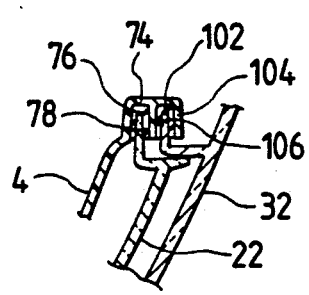
FIG. 14 is a sectional view of the headlight taken along a line T—T in FIG. 1.
Figure 16:
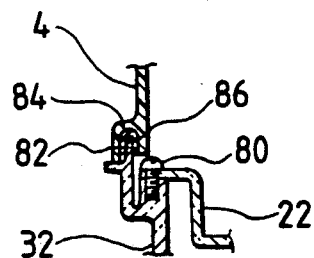
FIG. 16 is a sectional view of the headlight taken along a line N—N in FIG. 1.

To attach the inner lens 22 to the headlight body 4, the inner lens is fastened to the outer lens 32 by screws 80 as shown in FIG. 16, and the sealed edge portion 76 of the inner lens is fitted together with a sealant 78 in the sealing groove 74 of the headlight body 4, as shown in FIG. 14. At the time of attachment of the inner lens 22 to the headlight, the sealed edge portion 102 of the outer lens 32 is fitted together with a sealant 106 in the sealing groove 104 of the headlight body 4. Since the inner and the outer lens 22 and 32 are coupled to each other by the screws 80 in advance, the lenses can be efficiently attached to the headlight body 4.

The protector 28 is fitted at the hole 64 of the central portion of the inner lens 22, and attached to the inside of the lens by screws 88, as shown in FIG. 6. The protector 28 divides the space between the condensing lens 24 and the headlight body 4 and that between the condensing lens and the outer lens 32 so that the components around the condensing lens are protected from heat. The protector 28 is preferably made of die-cast aluminum so that heat in the space surrounded by the condensing lens 24, the protector and the outer lens 32 is transmitted out through the protector to lower the temperature of the space and thus prevent the protector and the outer lens from being thermally deformed.

The protector 28 may be made of another metal. For example, the protector 28 may be made of a metal sheet shaped cylindrically. The protector 28 is shaped as a truncated cone cut obliquely to the axis thereof at the smaller and larger diameters. An adjustment gap 90 is provided between the protector 28 and the condensing lens 24 at the inner end of the protector so as to enable the adjustment of the angle of the direction of emission of light from the bulb 12 of the low-beam lamp 8. Air between the condensing lens 24 and the outer lens 32 can flow into the interior of the headlight body 4 through the adjustment gap 90.

The holder 26 is attached by screws 92 to the front end portion of the ellipsoidal reflector 16 of the low-beam lamp 8. The holder 26, which is made of die-cast aluminum, supports the condensing lens 24. The holder 26 is nearly cylindrically shaped as a whole. A lens fitting metal support 94 is attached to the front end portion of the holder 26 by screws 96. The front end portion of the metal support 94 is bent in nearly an L shape, which portion holds the peripheral flange 98 of the condensing lens 24 at the front surface of the flange. The reflector 16, the shade 17, the holder 26, the metal holder 94 and the condensing lens 24 are thus coupled to each other.

The outer lens 32, which is a monolithic member made of a transparent polycarbonate resin, covers the fronts of the inner lens 22 and the condensing lens 24. The vertical sectional shape of the front portion of the outer lens 32, which is shown in FIGS. 7, 8, 9 and 10, is such that the shape is not continuous in radius of curvature and the front portion has a vertically central bent part 100 having a small radius of curvature. The bent part 100 is located so as to correspond to the condensing lens 24, as shown in FIG. 8. The bent part 100 acts as a lens due to the bending thereof to cancel the chromatic aberration of the condensing lens 24. Chromatic aberration is a phenomenon which occurs due to the spherical surface of the condensing lens 24 and is such that white light is bluishly colored because the refractive index of the condensing lens differs for different wavelengths or colors of light from the lamp bulb 12 so as to slightly vary the focal length of the lens for the different wavelengths or colors of rays. The bent part 100 acts as a lens to cause reverse chromatic aberration to offset the chromatic aberration of the condensing lens 24 so that light is emitted from the headlight without being bluish colored.

The sealed edge portion 102 of the outer lens 32 is fitted together with the sealant 106 in the sealing groove 104 of the edge portion of the headlight body 4 so that the outer lens is attached to the headlight body, as shown in FIGS. 6 and 14. To accurately perform the attachment, a pin 108 is integrally formed on the outer lens 32 in parallel with the sealed edge portion 102 at a part of the outer lens which is greatly curved and thinned to the corner of the body of the vehicle, and a pin hole, into which the pin is inserted, is provided in the headlight body 4, as shown in FIGS. 6 and 13. A jut 110, in which the pin hole is provided, is formed at the outside of the sealing groove 104 of the headlight body 4.

For the attachment operation, the sealed edge portion 102 is fitted into the sealing groove 104, and the pin 108 is inserted into the pin hole. Since the width of the sealed edge portion 102 is smaller than that of the sealing groove 104, the sealant 106 is filled in the gap between the portion and the inside of the groove. The sealant 106 is of a type which softens readily at high temperatures. Thus, it would be difficult to keep the sealed edge portion 102 positioned in the direction perpendicular to the surface of the portion. Moreover, the edge portion of the outer lens 32 is thinned and curved such that the portion is easy to bend to be displaced in the transverse direction of the vehicle. For such reasons, in a conventional headlight, it is difficult to retain such a sealed edge portion positioned in such a sealing groove.

However, in this embodiment, the pin 108 is engaged in the pin hole to make it easy to keep the sealed edge portion 102 positioned in the sealing groove 104. After the outer lens 32 is thus attached to the headlight body 4, clips 112, which are curved spring plates, are provided on five parts of the edge joint of the outer lens and the headlight body so that the clips clamp the projections 114 of the lens and those 116 of the body to each other, as shown in FIG. 11. The sealed edge portion 102 is pushed in the direction of depth of the sealing groove 104 due to the clamping force, while the portion would not be firmly held positioned in the direction of width of the groove. In other words, the outer lens 32 would be likely to be displaced relative to the headlight body 4 in the transverse direction of the vehicle by a distance corresponding to the thickness of the sealant 106 between the sealed edge portion 102 of the lens and the inside of the sealing groove 104 of the body. However, the pin 108 is inserted into the pin hole of the jut 110 so that the outer lens 32 is prevented from being displaced in the direction of the width of the sealing groove 104. The pin 108 and the pin hole are thus provided in the side portion of the headlight to prevent the outer lens 32 and the headlight body 4 from being displaced relative to each other, causing unwanted gaps.

Figure 4:
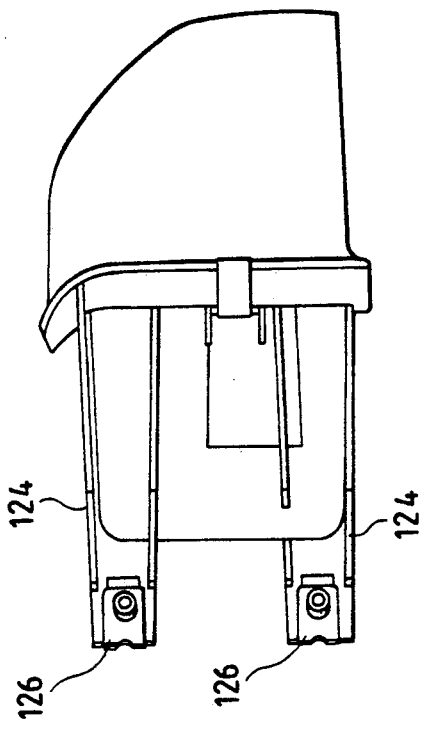
FIG. 4 is a side view of the headlight seen from the center line of a vehicle.
Figure 5:
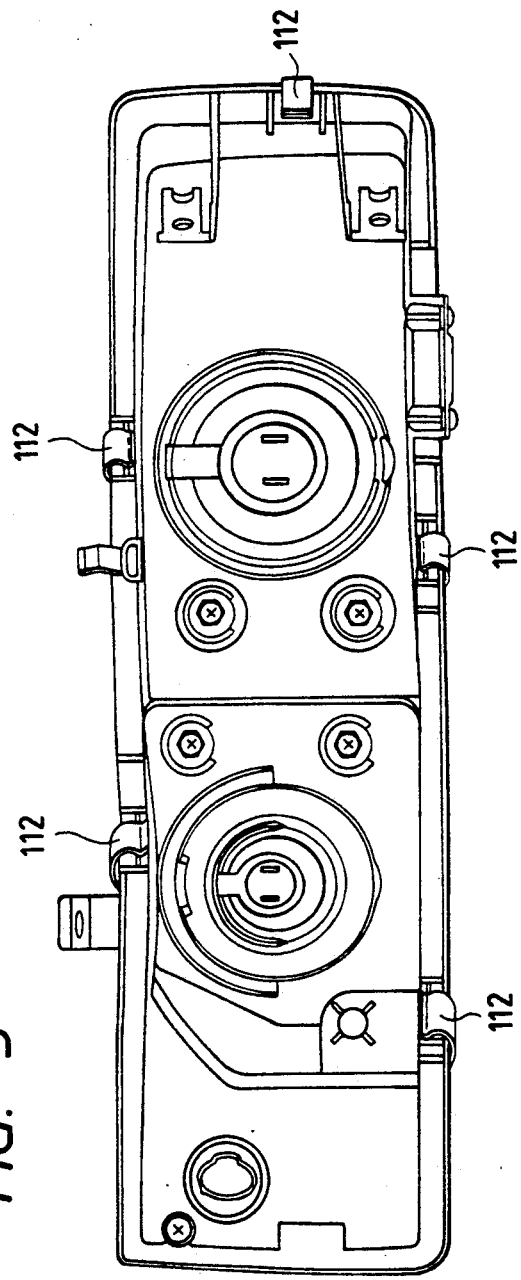
FIG. 5 is a rear view of the headlight.
Figure 15:
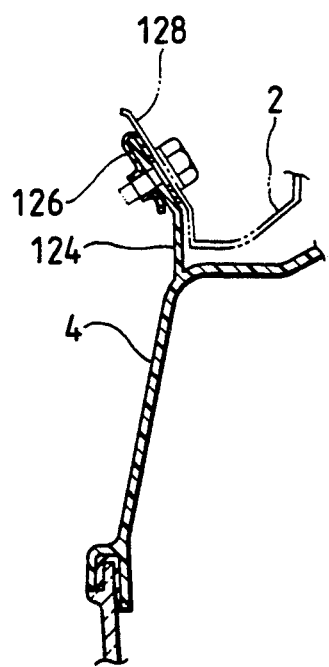
FIG. 15 is a sectional view of the headlight taken along a line M—M in FIG. 1.
Figure 17:
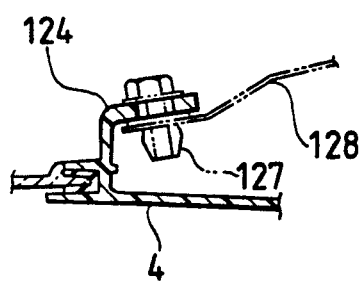
FIG. 17 is a sectional view of the headlight taken along a line Q—Q in FIG. 1.

As described above, the headlight body 4 and the outer lens 32 are attached to each other by engaging the sealing edge portion of the lens in the sealing groove 104 of the body. The sealing groove 104 is provided in the outer portion of the headlight body 4 outside the thick portion thereof, as shown in FIG. 8. The headlight body 4 has a projecting part on the outside of the body so as to define the sealing groove 104. Shown at 122 in FIG. 8 is the hood of the vehicle. The headlight body 4 has an air hole 129 for allowing the interior and exterior of the headlight to communicate with each other to prevent the lenses from collecting moisture thereon due to the temperature difference, as shown in FIG. 6, and further has communication holes 130 and 131 for the same purpose, as shown in FIGS. 8 and 11. To attach the headlight body 4 to the body of the vehicle, a clamp is secured to the headlight body by screws, and the vehicle body is provided with a jut, which is engaged with the clamp. To reinforce the attachment, attaching arms 24 are integrally formed on the central portion of the headlight body 4 so as to project backward from the portion in the front-to-rear direction of the vehicle, and clamped with spring nuts 126 and fasteners 127 at the tips of the arms to brackets 128 on the vehicle body by bolts, as shown in FIGS. 4, 15 and 17.

In a vehicular headlight constructed in accordance with the present invention, an inner lens and a hood, which is painted to block light, are integrally made of a light-transmissible resin so that no opening is formed between the inner lens and the hood. As a result, no light can leak through such an opening, and no adjustment gap between the inner lens and reflector is seen through the opening. Since the inner lens and the hood, which would be separately provided in a conventional headlight, are constituted by a single component, the number of components of the headlight is reduced to decrease the number of steps of assembly thereof.

What is claimed is:

1. A vehicular headlight comprising: means for producing at least two beams of illuminating light, and lens means positioned over said beam producing means such that said beam passes through said lens mean, said lens means comprising an inner lens, an outer lens, and a hood provided between said inner and outer lenses, extending around said inner lens, said inner lens and said hood being integrally formed with one another of a light-transmissible resin, said hood having a coating thereon to block light, wherein said light beam producing means comprises a first beam reflector, a second ellipsoidal beam reflector, a light bulb positioned within each of said first and second reflectors, a condensing lens positioned forward of said second ellipsoidal beam reflector, and means for mounting said condensing lens to a front end of said second ellipsoidal beam reflector.

2. The vehicular headlight of claim 1, wherein an aperture is formed in said inner lens forward of said condenser lens.

3. The vehicular headlight of claim 2, further comprising a protector having an outer end fixed to said inner lens around said aperture, said condenser lens projecting into an inner end of said protector, and a gap being provided between said inner end of said protector and condensing lens and said means for mounting said condensing lens to allow for positioning adjustment of said low-beam ellipsoidal reflector.

4. The vehicular headlight of claim 3, wherein said protector is shaped as a truncated cone cut obliquely to the axis thereof at smaller and larger diameters.

5. The vehicular headlight of claim 1, wherein a gap is provided between an inner surface of said inner lens and a front end of said parabolic reflector.

6. The vehicular headlight of claim 1, wherein said outer lens has a vertically central bent part of small radius of curvature, said bent part corresponding in position to said condensing lens, and said bent part acting as a lens for correcting chromatic aberration of said condenser lens.

7. The vehicular headlight of claim 1, further comprising a headlight body, a rear end portion of said outer lens being received in a sealing groove formed around a forward outer edge of said headlight body.

8. The vehicular headlight of claim 7, wherein said rear end portion of said outer lens is thinned and curved, and a sealant seals said rear end portion in said groove.

9. The vehicular headlight of claim 8, wherein said outer lens has a pin formed integrally therewith, said pin being received in a hole formed in said headlight body for accurately positioning said lens means with respect to said headlight body.

10. The vehicular headlight of claim 9, wherein said hole is formed in a jut in said headlight body formed outside said sealing groove.

11. The vehicular headlight of claim 1, wherein said inner lens is fixed to said outer lens.

12. The vehicular headlight of claim 1, wherein said inner lens is fixed to said outer lens by screws.

13. The vehicular headlight of claim 1, wherein said first reflector is a paraboloidal reflector.

14. The vehicular headlight of claim 1, wherein said first beam reflector is a high-beam reflector and said second ellipsoidal beam reflector is a low-beam reflector.

15. The vehicular headlight of claim 1, wherein said first beam reflector is a low-beam reflector and said second ellipsoidal beam reflector is a high-beam reflector.

16. The vehicular headlight of claim 1, wherein said first beam reflector comprises a reflector for a fog lamp, and said second ellipsoidal beam reflector is selectably used as a high-beam and a low-beam reflector.

17. The vehicular headlight of claim 1, wherein said first beam reflector comprises a reflector for a clearance lamp and said second ellipsoidal beam reflector comprises a reflector for a fog lamp.

18. The vehicular headlight of claim 1, further comprising a third beam reflector.

19. The vehicular headlight of claim 18, wherein said first beam reflector is a high-beam reflector, said second ellipsoidal beam reflector is a low-beam reflector, and said third beam reflector comprises a reflector for a fog lamp.

20. The vehicular headlight of claim 18, wherein said first beam reflector is a high-beam reflector, said second ellipsoidal beam reflector is a low-beam reflector, and said third beam reflector comprises a reflector for a clearance lamp.

21. A vehicular headlight comprising: means for producing at least one beam of illuminating light, and lens means positioned over said beam producing means such that said beam passes through said lens means, said lens means comprising an inner lens, an outer lens, and a hood provided between said inner and outer lenses, extending around said inner lens, said inner lens and said hood being integrally formed with one another of a light-transmissible resin, said hood having a coating thereon to block light, wherein said light beam producing means comprises a reflector disposed rearward of said inner lens with a gap being formed between a forward periphery of said reflector and said hood, and means for tiltably adjusting said reflector relative to said inner lens.

22. The vehicular headlight of claim 21, wherein said beam producing means comprises a high-beam paraboloidal reflector and a low-beam ellipsoidal reflector, a light bulb positioned within each of said reflectors, a condensing lens positioned forward of said low-beam ellipsoidal reflector, and means for mounting said condensing lens to a front end of said low-beam ellipsoidal reflector.

23. The vehicular headlight of claim 22, wherein an aperture is formed in said inner lens forward of said condenser lens.

24. The vehicular headlight of claim 23, further comprising a protector having an outer end fixed to said inner lens around said aperture, said condenser lens projecting into an inner end of said protector, and a gap being provided between said inner end of said protector and condensing lens and said means for mounting said condensing lens to allow for positioning adjustment of said low-beam ellipsoidal reflector.

25. The vehicular headlight of claim 24, wherein said protector is shaped as a truncated cone cut obliquely to the axis thereof at smaller and larger diameters.

26. The vehicular headlight of claim 22, wherein a gap is provided between an inner surface of said inner lens and a front end of said parabolic reflector.

27. The vehicular headlight of claim 22, wherein said outer lens has a vertically central bent part of small radius of curvature, said bent part corresponding in position to said condensing lens, and said bent part acting as a lens for correcting chromatic aberration of said condenser lens.

28. The vehicular headlight of claim 21, further comprising a headlight body, a rear end portion of said outer lens being received in a sealing groove formed around a forward outer edge of said headlight body.

* * * * *